T. HOOKER.
MICROMETER GAGE.
APPLICATION FILED JULY 12, 1912.
1,193,549.
Patented Aug. 8, 1916.
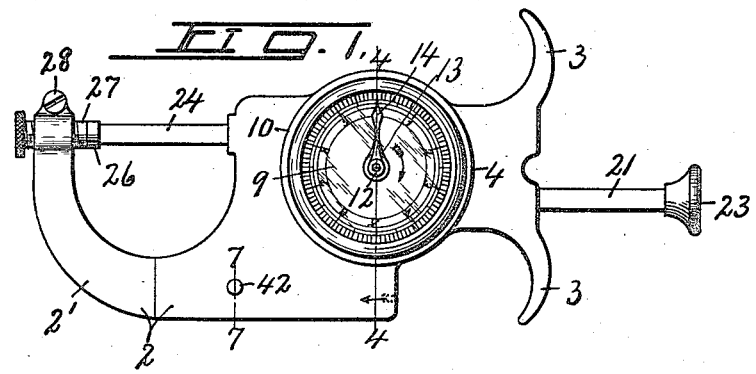
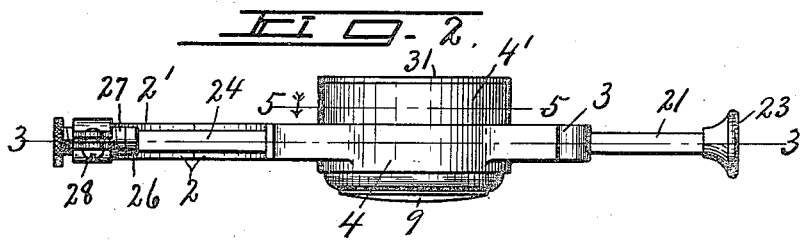
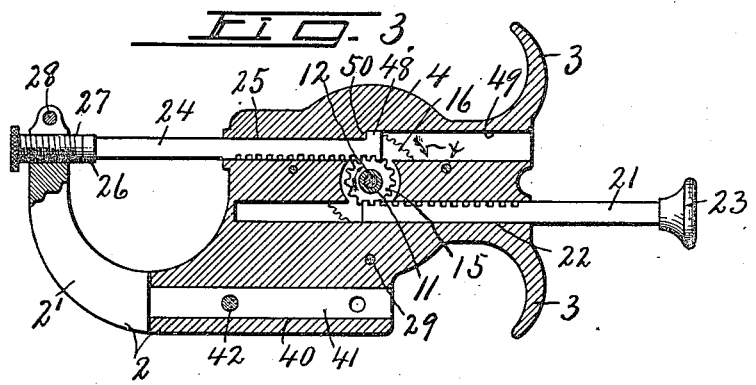
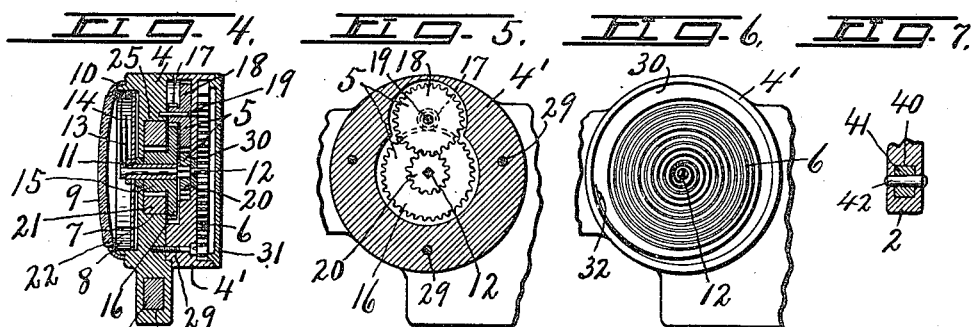
Witnesses:
Inventor
Thomas Hooker
By Attorney
Howard P. Denison

UNITED STATES PATENT OFFICE.

THOMAS HOOKER, OF SYRACUSE, NEW YORK.

MICROMETER-GAGE.

1,193,549.  Specification of Letters Patent.  Patented Aug. 8, 1916.

Application filed July 12, 1912. Serial No. 709,114.

*To all whom it may concern:*

Be it known that I, THOMAS HOOKER, of Syracuse, in the county of Onondaga, in the State of New York, have invented new and useful Improvements in Micrometer-Gages, of which the following, taken in connection with the accompanying drawings, is a full, clear, and exact description.

This invention relates to certain improvements in micrometer gages involving the use of a graduated dial and index fingers for indicating the relative position or degree of separation of the contact points between which the object to be measured is inserted.

The main object is to enable the contact points to be easily and quickly opened to any degree or distance within the range of the instrument and automatically brought into contact with the surfaces, the distance between which is to be measured, without particularly careful attention to manipulation and at the same time to provide the instrument with a graduated dial and suitable index fingers operatively connected to and actuated by one of the movable contacts for indicating at a glance the distance between the contacts or between the surfaces to be engaged thereby. In other words I have sought to render the operation of measuring the thicknesses or diameters of various objects within the range of the instrument more expeditious and the reading of such measurements more practical in the hands of either skilled or unskilled workmen.

Another object is to enable the instrument to be held and operated in one hand, while the work to be measured may be held or manipulated between the contacts with the other hand.

A further object is to provide means for automatically restoring the contacts to their normal closed positions and also to bring them into contact with the object to be measured after such contacts have been forced apart manually.

A still further object is to provide means for increasing the range of measurement of the device when necessary.

Other objects and uses will be brought out in the following description.

In the drawings—Figures 1 and 2 are respectively a face view and a top plan of a micrometer gage embodying various features of my invention. Fig. 3 is a longitudinal vertical sectional view taken on line 3—3, Fig. 2. Fig. 4 is a transverse vertical sectional view through the dial and gear case taken on line 4—4, Fig. 1. Fig. 5 is a vertical sectional view through the gear case taken on line 5—5, Fig. 2. Fig. 6 is a rear face view of the motor spring and adjacent portion of the gear case in which it is mounted. Fig. 7 is a transverse sectional view through the front portion of the frame taken on line 7—7, Fig. 1.

The gage herein illustrated is of comparatively small size adapted to be carried in the pocket for ready use in measuring objects of relatively small size, as, for example, one inch and decimal fractions thereof in one-thousands but may be extended to embrace objects of larger size, and comprises a frame —1— having one end provided with a U-shape arm —2— and its opposite end provided with finger grips —3— to facilitate the retention of the instrument in one hand while the contacts are being opened by the same hand to permit the insertion of the object to be measured with the other hand.

The central portion of the frame —1— between the arm —2— and finger grips —3— is provided with a circular barrel or cylinder —4— forming a suitable casing for a train of gears —5—, a spring motor —6— and a dial plate —7—.

The dial —7— is seated in a circular socket —8— in the front face of the frame —1— and is covered and protected by a transparent glass or crystal —9— which is held in place by a bezel —10— engaging an annular shoulder surrounding the socket, thereby forming an intervening space between the glass and dial for the reception of a pair of index fingers presently described.

A tubular sleeve —11— is centrally journaled in the barrel or cylinder —4— and receives an independently revoluble spindle —12— which is journaled partly in the sleeve and centrally in the barrel —4— and is therefore co-axial with the sleeve and extends through and beyond the opposite ends thereof. Index fingers —13— and —14— are secured respectively to the front ends of the sleeve —11— and spindle —12— to rotate therewith.

A pinion —15— and a relatively larger gear —16— forming a part of the gear train are secured to the sleeve —11—, the gear —16— meshing with a relatively small pinion —17— which in turn is secured to and co-axial with a somewhat larger gear —18— also forming a part of the gear train and mounted upon a suitable supporting spindle —19—, the latter being journaled in the gear case or barrel —4—.

The gear —18— meshes with a relatively small pinion —20— tight on the rear end of the spindle —12— and it therefore follows that when the pinion —17— is rotated, rotary motion will be imparted to the index fingers —13— and —14— around the dial —7— and that the index finger —14— on the spindle —12— will be revolved at greater speed than the index finger —13—.

The gears of the train —5— are preferably proportioned so as to move the index fingers —13— and —14— in ratio of 1 to 10, the gears —16— and —17— being, in this instance, in the ratio of 5 to 1, while the ratio of the gears —18— and —20— is 2 to 1, thus moving the index finger —14— ten degrees to every one degree of movement of the index finger —13—.

The drum or pinion —15— is actuated rotarily by means of a reciprocatory plunger —21— which is guided in a lengthwise slot or way —22— in the frame —1— and is provided with a suitable handle —23— by which it may be operated. This rotary movement of the drum or pinion —8— is utilized to reciprocate a contact bar —24— which is operatively connected to the opposite side of said drum from that of the plunger —21— and is movable in a lengthwise slot or way —25— parallel with the way —22—. The bar —24— is provided with a contact head —26— coöperating with a similar contact member —27— for engaging opposite surfaces of an object, the distance between which is to be measured.

The contact member —27— preferably consists of a screw engaged in a threaded aperture in the outer end of the U-shape arm —2— and adjustable axially by rotation to properly calibrate the instrument and is held in its adjusted position by a clamping screw —28— connecting opposite sides of the split hub in which the screw is mounted.

The gear case or barrel —1— is divided circumferentially in approximately the plane of the meeting faces between the gears —15— and —16—, thus forming an outer rear removable section —4'— which is secured to the main body by one or more clamping screws —29—.

The spring motor —6— is arranged within a chamber —30— in the rear side of the barrel section —4'— and is inclosed and concealed therein by a removable cap section —31— which may be held in place by any suitable fastening means, not necessary to herein illustrate or describe, the spring motor —6— having one end attached to the rear end of the spindle —12— and its other end attached to a pin —32— on the section —8'—. This spring —6— is tensioned to rotate the spindle —12— and its drum or pinion —15— in the direction indicated by arrow —x—, Fig. 3 to automatically close the contacts —26— and —27— upon the work or upon each other and also to return the plunger —21— to its normal position when the contacts are brought together.

The circumferential length of the drum or pinion —15— on the pitch circle is preferably equal to the maximum degree of movement of the contact —26— from its normal closed position which, in this instance, is one inch, while the dial —7— is graduated in tenths and numbered consecutively from zero to nine, each tenth division being sub-divided into ten equal graduations representing hundredths.

The plungers —21— and —24— are provided with toothed racks meshing with the teeth of the drum or pinion —15— and it therefore follows that when the plunger —21— is forced inwardly by hand from its normal position against the action of the retracting spring —6—, reverse motion will be transmitted to the contact bar —24— through the medium of the pinion —15—, thereby separating the contacts —26— and —27— a distance corresponding to the degree of rotation of said pinion which will be indicated by the index finger —13— on the dial —7—. During this operation, the index finger —14— will be moved around the dial ten degrees to every one of the index fingers —13— through the medium of the gear train —5—, thus giving a reading to one-thousandth of an inch. For example, in testing the thickness or diameter of an object, the instrument is held in one hand with two of the fingers engaged with the grips —3— and the hand or thumb in contact with the operating member —23— of the plunger —21—, whereupon by pressing the plunger inwardly, the contact bar —24— will be opened to separate the contacts —26— and —27—, thus permitting the object to be placed by the other hand between the contacts, and by releasing the pressure between the plunger —21—, the spring —6— will return the contacts against opposite faces of the object and if when in this position the index finger —13— takes the position between the graduations marked —1— and —2— and the index finger —14— assumes a position midway between the graduations —2— and —3— as, for instance, the fifth graduation, the thickness or diameter of the object interposed between the contacts will be read as one hundred and twenty-five thousandths. In like manner by bringing the contacts into engagement with objects of one inch thickness or less, such dimension will be accurately indicated by the index fingers on the dial.

In order that the instrument may be used for measuring objects of greater thickness or diameter than one inch, I have made the U-shape arm —2— in sections, one of which, as the outer end section —2'— carrying the contact member —27—, is adjustable relatively to the frame —1—, and for this purpose have provided the portion of the arm —2— united to said frame with a lengthwise guide opening —40— for receiving a guide rod —41— on the section —2'—, said guide rod —41— being of sufficient length to permit the section —2'— to be adjusted one inch from its normal position, thereby separating the contact —27— one inch from the normal position of the contact —26— and adding one more inch to the range of measurement of the instrument, the section —2'— being held in either of its adjusted positions by means of a tapering key or pin —42— passed through registering apertures in the guide rod —41— and adjacent portion of its supporting frame.

In order to prevent outward movement of the bars —21— and —24— when the section —2'— is adjusted from its normal position, I provide the rear end of the bar —24— with a stop shoulder —48— which is movable in a groove —49— in the frame —1— at one side of the socket —25— and engages a limiting stop —50— at the inner end of the groove, thereby holding the bars —21— and —24— against being forced outwardly by the action of the spring —6—.

In measuring the distances between two surfaces with the arm —2'— extended in the manner described, it is simply necessary to add one inch to the reading indicated by the index fingers on the dial, these index fingers both being registered with the zero graduation when the measuring bar —24— is in its normal extended position whether in contact with the member —27— or when the arm —2'— is extended in the manner described.

What I claim is:

A micrometer gage comprising a frame having a U-shape arm at one end and a relatively stationary contact member thereon, a pinion journaled in the frame, a sliding contact member having a toothed rack engaged with one side of the pinion, a plunger mounted on the frame and provided with a toothed rack engaging the opposite side of the pinion whereby the movement of the plunger in one direction will cause the movement of the sliding contact bar in the opposite direction, a dial concentric with the pinion, an index finger movable around the dial, and means for transmitting motion from the pinion to the index finger.

In witness whereof I have hereunto set my hand on this 8th day of July 1912.

THOMAS HOOKER.

Witnesses:
H. E. CHASE,
E. S. TUCKER.